US010082947B2

(12) United States Patent
Kohashi et al.

(10) Patent No.: US 10,082,947 B2
(45) Date of Patent: Sep. 25, 2018

(54) INFORMATION PROCESSING DEVICE, INFORMATION PROCESSING METHOD, AND INFORMATION PROCESSING PROGRAM

(71) Applicant: Panasonic Intellectual Property Corporation of America, Torrance, CA (US)

(72) Inventors: Yasuo Kohashi, Osaka (JP); Kazushige Yamada, Osaka (JP); Hirokazu Kobayashi, Tokyo (JP); Kohei Yamaguchi, Osaka (JP); Ryo Yokoyama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/285,983

(22) Filed: Oct. 5, 2016

(65) Prior Publication Data
US 2017/0024101 A1    Jan. 26, 2017

Related U.S. Application Data

(63) Continuation of application No. 14/232,033, filed as application No. PCT/JP2013/003232 on May 21, 2013, now Pat. No. 9,529,518.

(30) Foreign Application Priority Data

May 25, 2012 (JP) ................................ 2012-119487

(51) Int. Cl.
G06F 3/0486 (2013.01)
G06F 3/0488 (2013.01)
(Continued)

(52) U.S. Cl.
CPC .......... *G06F 3/0486* (2013.01); *G06F 1/1647* (2013.01); *G06F 3/041* (2013.01);
(Continued)

(58) Field of Classification Search
None
See application file for complete search history.

(56) References Cited

U.S. PATENT DOCUMENTS 5,327,161 A    7/1994 Logan
5,585,821 A    12/1996 Ishikura
(Continued)

FOREIGN PATENT DOCUMENTS

CN        1949905 A     4/2007
JP    2010-211400 A     9/2010
(Continued)

OTHER PUBLICATIONS

English Translation of Search Report issued in Chinese Application No. 201380001571 dated Oct. 25, 2016.
(Continued)

*Primary Examiner* — Phenuel Salomon
(74) *Attorney, Agent, or Firm* — Pearne & Gordon LLP

(57) ABSTRACT

This information processing device enables a user to easily move objects between applications simultaneously displayed on touch panels. The information processing device is provided with touch panels on which applications are simultaneously displayed. A touch panel coordinate management unit detects that an application object has existed for a prescribed time in a defined area of the touch panel when the object is being dragged. An application control unit and a display control unit move the display of the application to a position that allows the object to be dropped as a trigger for detecting the existence of the object in the defined area.

4 Claims, 7 Drawing Sheets

(51) Int. Cl.
*G06F 1/16* (2006.01)
*G06F 3/041* (2006.01)
*G06F 3/0482* (2013.01)

(52) U.S. Cl.
CPC .......... *G06F 3/0482* (2013.01); *G06F 3/0488* (2013.01); *H04M 2250/16* (2013.01); *H04M 2250/22* (2013.01)

(56) References Cited

U.S. PATENT DOCUMENTS

| | | | |
|---|---|---|---|
| 6,084,553 A | 7/2000 | Walls | |
| 6,118,433 A * | 9/2000 | Jenkin | G06F 3/0488 345/1.3 |
| 6,229,502 B1 * | 5/2001 | Schwab | G06F 15/0283 345/1.1 |
| 6,252,563 B1 * | 6/2001 | Tada | G06F 3/038 178/18.01 |
| 6,331,840 B1 | 12/2001 | Nielson | |
| 6,545,669 B1 * | 4/2003 | Kinawi | G06F 3/0486 345/1.1 |
| 6,643,124 B1 | 11/2003 | Wilk | |
| 8,246,080 B1 | 8/2012 | Bennett | |
| 8,473,870 B2 | 6/2013 | Hinckley | |
| 8,610,678 B2 * | 12/2013 | Ikeda | G06F 3/04883 345/1.1 |
| 8,959,446 B2 | 2/2015 | Igeta | |
| 9,046,992 B2 * | 6/2015 | Sirpal | G06F 1/1616 |
| 9,098,183 B2 | 8/2015 | Vonshak | |
| 9,104,302 B2 * | 8/2015 | Chai | G06F 3/04817 |
| 2003/0076364 A1 | 4/2003 | Martinez | |
| 2004/0049743 A1 * | 3/2004 | Bogward | G06F 1/162 715/262 |
| 2005/0270278 A1 * | 12/2005 | Ouchi | G06F 3/03545 345/173 |
| 2006/0146765 A1 * | 7/2006 | Van De Sluis | G06F 3/016 370/338 |
| 2007/0064004 A1 * | 3/2007 | Bonner | G06F 3/04883 345/442 |
| 2007/0085759 A1 * | 4/2007 | Lee | G06F 1/1616 345/1.1 |
| 2007/0288599 A1 * | 12/2007 | Saul | G06F 3/0486 709/218 |
| 2007/0294357 A1 * | 12/2007 | Antoine | G06F 17/30241 709/206 |
| 2008/0256471 A1 * | 10/2008 | Okamoto | G06F 3/0486 715/769 |
| 2009/0322689 A1 * | 12/2009 | Kwong | G06F 3/04883 345/173 |
| 2010/0066643 A1 * | 3/2010 | King | G06F 1/1616 345/1.3 |
| 2010/0182247 A1 * | 7/2010 | Petschnigg | G06F 1/1647 345/173 |
| 2010/0188352 A1 * | 7/2010 | Ikeda | G06F 3/04883 345/173 |
| 2010/0225601 A1 * | 9/2010 | Homma | G06F 3/0416 345/173 |
| 2010/0259494 A1 * | 10/2010 | Kii | G06F 3/0416 345/173 |
| 2010/0259515 A1 * | 10/2010 | Kohara | G06F 1/1624 345/204 |
| 2010/0281363 A1 * | 11/2010 | Inaba | G06F 3/0488 715/702 |
| 2011/0018821 A1 * | 1/2011 | Kii | G06F 1/1616 345/173 |
| 2011/0072344 A1 | 3/2011 | Harris | |
| 2011/0099497 A1 * | 4/2011 | Fok | G06F 3/0486 715/769 |
| 2011/0209104 A1 * | 8/2011 | Hinckley | G06F 3/0416 715/863 |
| 2011/0260997 A1 * | 10/2011 | Ozaki | G06F 1/1618 345/173 |
| 2012/0017165 A1 * | 1/2012 | Gardner | G06F 17/30899 715/771 |
| 2012/0236035 A1 * | 9/2012 | Kimura | G06F 3/0488 345/660 |
| 2012/0274551 A1 * | 11/2012 | Ishizuka | G06F 3/0488 345/156 |
| 2013/0097541 A1 * | 4/2013 | Yerli | G06F 9/451 715/769 |
| 2013/0167080 A1 * | 6/2013 | Ari | G06F 3/0481 715/801 |

FOREIGN PATENT DOCUMENTS

| | | |
|---|---|---|
| JP | 2010-250463 A | 11/2010 |
| JP | 2011-070525 A | 4/2011 |
| WO | 2011/037222 A1 | 3/2011 |

OTHER PUBLICATIONS

International Search Report for Application No. PCT/JP2013/003232 dated Jun. 18, 2013.

* cited by examiner

INFORMATION PROCESSING DEVICE, INFORMATION PROCESSING METHOD, AND INFORMATION PROCESSING PROGRAM

This is a continuation of U.S. application Ser. No. 14/232,033 filed on Jan. 10, 2014 which is the National Phase Entry of International Application No. PCT/JP2013/003232 filed May 21, 2013 which claims priority from Japanese Patent Application No. 2012-119487 filed on May 25, 2012. The contents of these applications are incorporated herein by reference in their entireties.

TECHNICAL FIELD

The present invention relates to an information processing apparatus, an information processing method and an information processing program applied to a terminal that includes a touch panel.

BACKGROUND ART

In recent years, a touch panel screen of a portable terminal such as a smart phone or a tablet has been increased in size.

Patent literature (hereinafter, referred to as "PTL") 1 discloses a terminal that includes a touch panel having a large screen (hereinafter, referred to as a "large screen terminal"), for example. The terminal disclosed in PTL 1 can be in a spread state or closed state by moving two housings respectively including touch panels, through a hinge. Thus, the user may spread two touch panels to use the two touch panels as a single large screen touch panel.

CITATION LIST

Patent Literature

PTL 1
Japanese Patent Application Laid-Open No. 2010-250463

SUMMARY OF INVENTION

Technical Problem

Such a large screen terminal, however, has a problem in that, when a plurality of software applications (hereinafter, referred to as "applications") are simultaneously displayed, the user cannot move an object between the applications. Hereinafter, an example of this problem will be described.

For example, when a user operates a large screen terminal by one hand while holding the large screen terminal by the hand, it is impossible for the user to touch every part of the screen by a finger (for example, a thumb) that comes in contact with and operates the touch panel. That is, even though the user selects and drags an object from application A displayed in a range where the user can touch by the thumb, it is not possible to drop the object to application B displayed in a range where the user cannot touch by the thumb. Accordingly, the user cannot move the object from application A to application B.

Further, for example, when the user performs the operation by one hand while holding the large screen terminal by the other hand, a finger that comes in contact with and operates the screen can touch every part of the screen. However, if a dragging distance is long, an operation error easily occurs. That is, while the user selects and drags an object from application A, the finger dragging the object is separated from the touch panel, and thus, the user cannot drop the object to application B. Accordingly, the user cannot move the object from application A to application B.

Further, for example, when the user operates the terminal by one hand while holding the terminal disclosed in PTL 1 by the other hand, an operation error easily occurs because touch panels are discontinuous due to the presence of the parts of the housings of the touch panels between the housings. That is, when the user selects and drags an object from application A, the finger used for dragging the object is in contact with the part of the housing, the finger is separated from the touch panel, so that the user cannot drop the object to application B. Accordingly, the user cannot move the object from application A to application B.

An object of the present invention is to provide a technique that allows a user to easily move an object between applications that are simultaneously displayed on touch panels.

Solution to Problem

An information processing apparatus according to an aspect of the present invention is an information processing apparatus including a touch panel that simultaneously displays a first application and a second application, the information processing apparatus including: a detecting section that detects that an object of the first application stays in a specified area of the touch panel for a predetermined period of time while the object is being dragged; and a control section that moves the second application being displayed to a position where the object is droppable, by being triggered by the detection of the staying of the object.

An information processing method according to an aspect of the present invention is an information processing method performed by a terminal including a touch panel that simultaneously displays a first application and a second application, the information processing method including: detecting that an object of the first application stays in a specified area on the touch panel for a predetermined period of time while the object is being dragged; and moving the second application to a position where the object is droppable by being triggered by the detection of the staying of the object.

An information processing program according to an aspect of the present invention is an information processing program causing a computer of a terminal to execute processing, the terminal including a touch panel that simultaneously displays a first application and a second application, the information processing program causing the computer to execute the processing including: detecting that an object of the first application stays in a specified area on the touch panel for a predetermined period of time while the object is being dragged; and moving the second application to a position where the object is droppable by being triggered by the detection of the staying of the object.

Advantageous Effects of Invention

According to the present invention, a user can easily move an object between applications that are simultaneously displayed on touch panels.

DESCRIPTION OF EMBODIMENTS (Embodiment 1)

Hereinafter, Embodiment 1 of the present invention will be described in detail with reference to the accompanying drawings.

<Exterior of Information Processing Apparatus 100>

Figure 1:
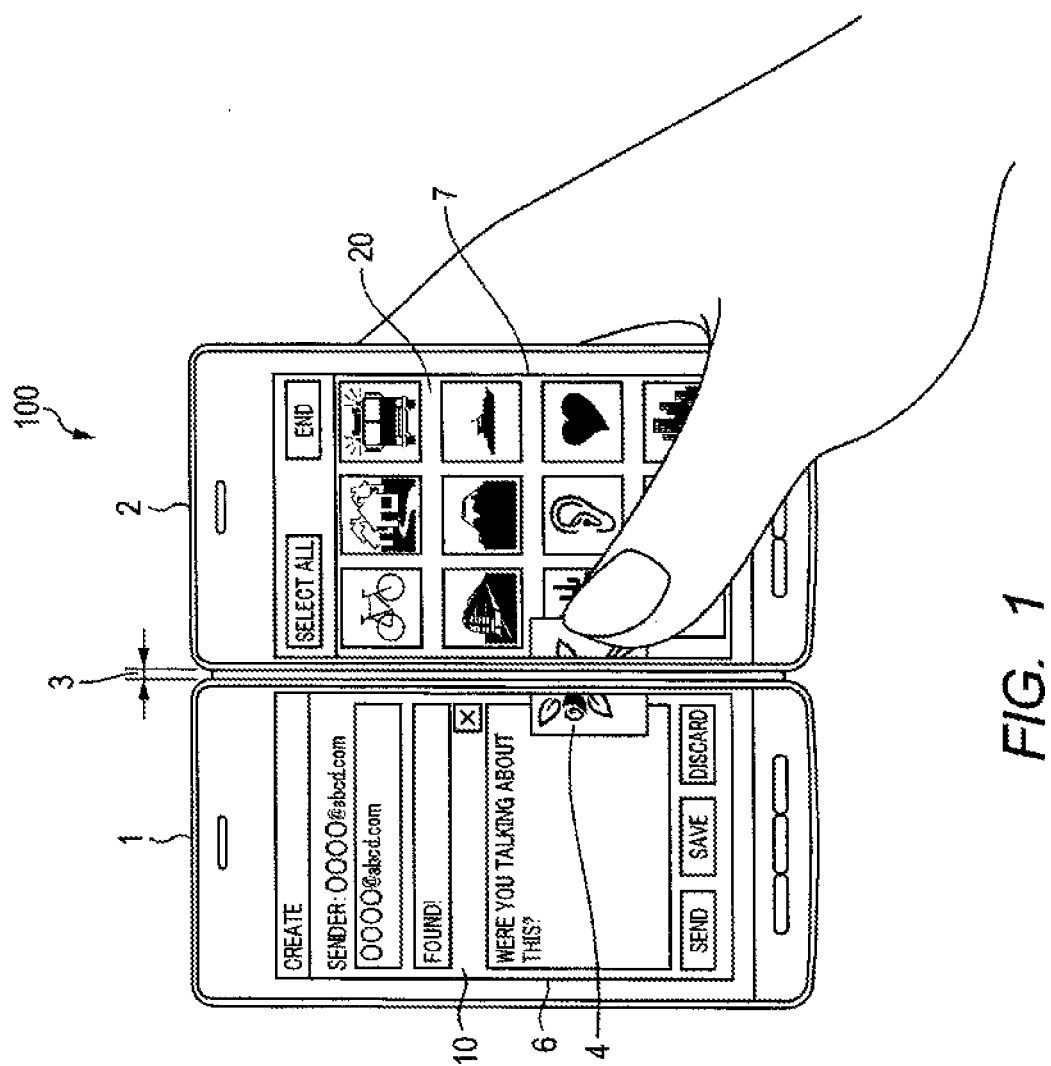
FIG. 1 is a diagram illustrating an example of an exterior of an information processing apparatus according to Embodiment 1 of the present invention.

FIG. 1 is a diagram illustrating an example of an exterior of information processing apparatus 100 according to the present embodiment. A smart phone or the like may be cited as an example of the application target of information processing apparatus 100.

In FIG. 1, information processing apparatus 100 includes housing 1 and housing 2. Housing 1 and housing 2 each have a flat plate shape. Further, housing 1 and housing 2 are connected to each other through hinge 3. Further, housing 1 includes touch panel 10, and housing 2 includes touch panel 20.

Information processing apparatus 100 allows the user to perform an opening/closing operation by moving housings 1 and 2 using hinge 3 as a shaft. By performing the opening/closing operation, the user may put information processing apparatus 100 into a folded state by putting together touch panels 10 and 20 or a spread state by spreading touch panels 10 and 20, as necessary. FIG. 1 illustrates the appearance of information processing apparatus 100 in the spread state where touch panels 10 and 20 are spread. In the spread state, the user may use two touch panels 10 and 20 as a single large screen touch panel.

In the spread state shown in FIG. 1, information processing apparatus 100 may display two applications at the same time. In FIG. 1, touch panel 10 displays application 6, and touch panel 20 displays application 7. Application 6 is a mail application for creation, transmission and reception of a mail, for example. Application 7 is a viewer application for reading image data, for example. Further, application 7 displays a plurality of image data thumbnails. Each thumbnail is an object capable of being moved to application 6 from application 7 by drag and drop. Here, the term "move" includes the meaning of copying image data.

<Outline of characteristic operation of information processing apparatus 100>

A characteristic operation of information processing apparatus 100 will be described with reference to FIGS. 2A and 2B. Hereinafter, a case where the user selects object 4 of application 7 in the state of FIG. 1 and drags and drops object 4 into application 6 will be described as an example.

Figure 2B:
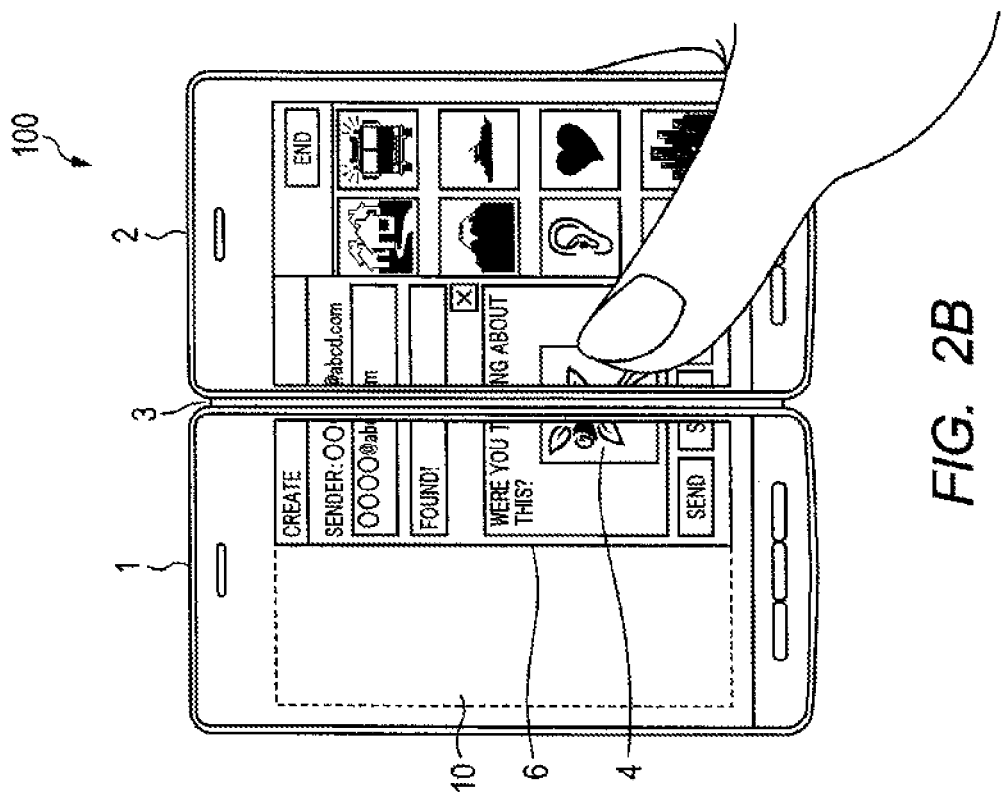
FIGS. 2A and 2B are diagrams illustrating the outline of a characteristic operation of the information processing apparatus according to Embodiment 1 of the present invention.
Figure 2A:
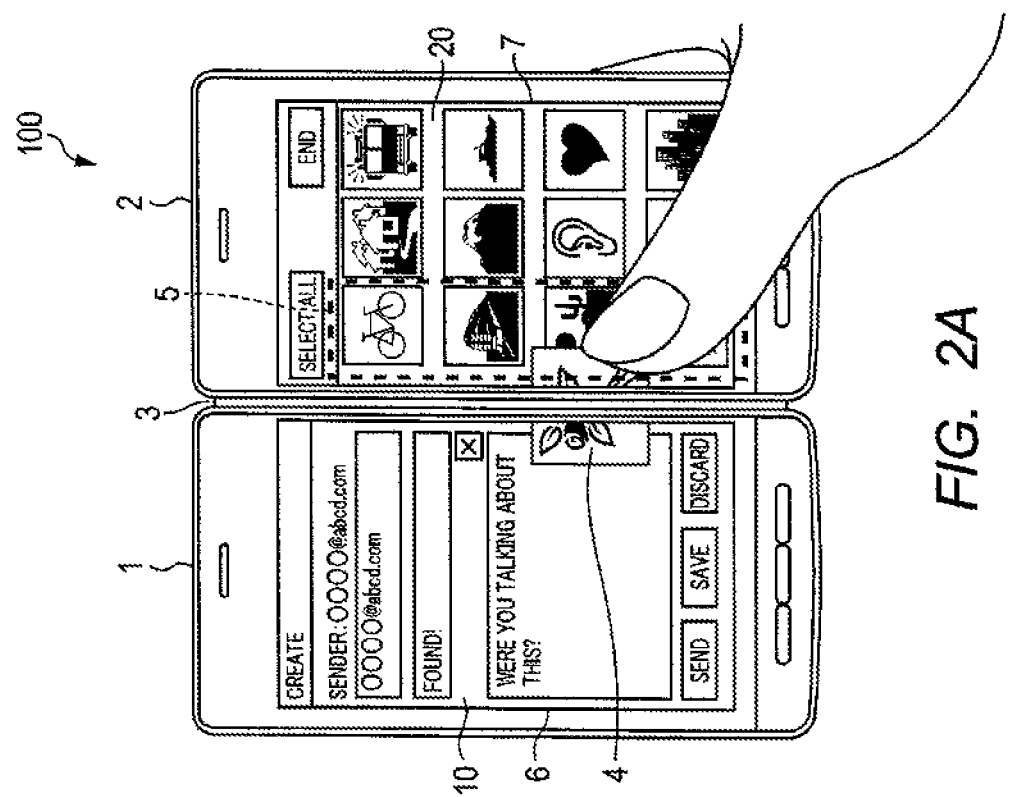

FIGS. 2A and 2B are diagrams illustrating a screen transition example when information processing apparatus 100 is in operation.

In FIG. 2A, touch panel 20 includes predetermined area (hereinafter, referred to as "specified area") 5 as a part of touch panel 20. Specified area 5 is positioned near a boundary between touch panel 10 and touch panel 20, in other words, near a display boundary between application 6 being displayed and application 7 being displayed. When the user wants to move object 4 of application 7 to application 6, the user first touches a part of object 4 being displayed in an object list of application 7, for example, to select object 4. Object 4 is a thumbnail, for example. Then, the user drags selected object 4 toward touch panel 10 in which application 6 is displayed. Further, if object 4 reaches specified area 5, the user waits while keeping object 4 being dragged. Specified area 5 may be displayed on touch panel 20 so as to be visible by the user, or may not be displayed when the user can estimate specified area 5. Further, specified area 5 may be included in touch panel 10.

Then, application 6 displayed on touch panel 10 slides (moves in parallel) by a certain distance toward touch panel 20 by being triggered by an event that object 4 that is being dragged (hereinafter, referred to as "dragged state") stays in specified area 5 for a certain period of time, and stops sliding. As a result, as shown in FIG. 2B, application 6 is displayed over touch panels 10 and 20. Here, application 6 is displayed under object 4 in the dragged state and on top of application 7. The user drops object 4 in this state. Thus, the user completes the operation of moving object 4 from application 7 to application 6.

The operation in which one of two applications that are simultaneously displayed is moved and then displayed on the touch panel where the other one of the two applications is displayed in the manner described above is referred to as a "slide display operation." Further, conversely, the operation in which the application that is slid and displayed is slid back and displayed at the original position is referred to as a "slide-return display operation."

In this way, in order for the user to move object 4 from application 7 to application 6 in information processing apparatus 100 of the present embodiment, the user can simply drag object 4 to specified area 5 of touch panel 20 on which application 7 is displayed. That is, it is not necessary for the user to drag object 4 all the way to touch panel 10 on which application 6 is displayed. Accordingly, information processing apparatus 100 can solve the above-mentioned problem in that the finger used to operate the touch panel does not reach the display area of the application which is the moving destination of the object. Further, information processing apparatus 100 can solve the above-mentioned problem in that the operation error easily occurs due to the length of the dragging distance or the discontinuity between the touch panels. As a result, information processing apparatus 100 of the present embodiment allows the user to easily move an object between applications that are simultaneously displayed on touch panels.

<Configuration of Information Processing Apparatus 100>

Figure 3:
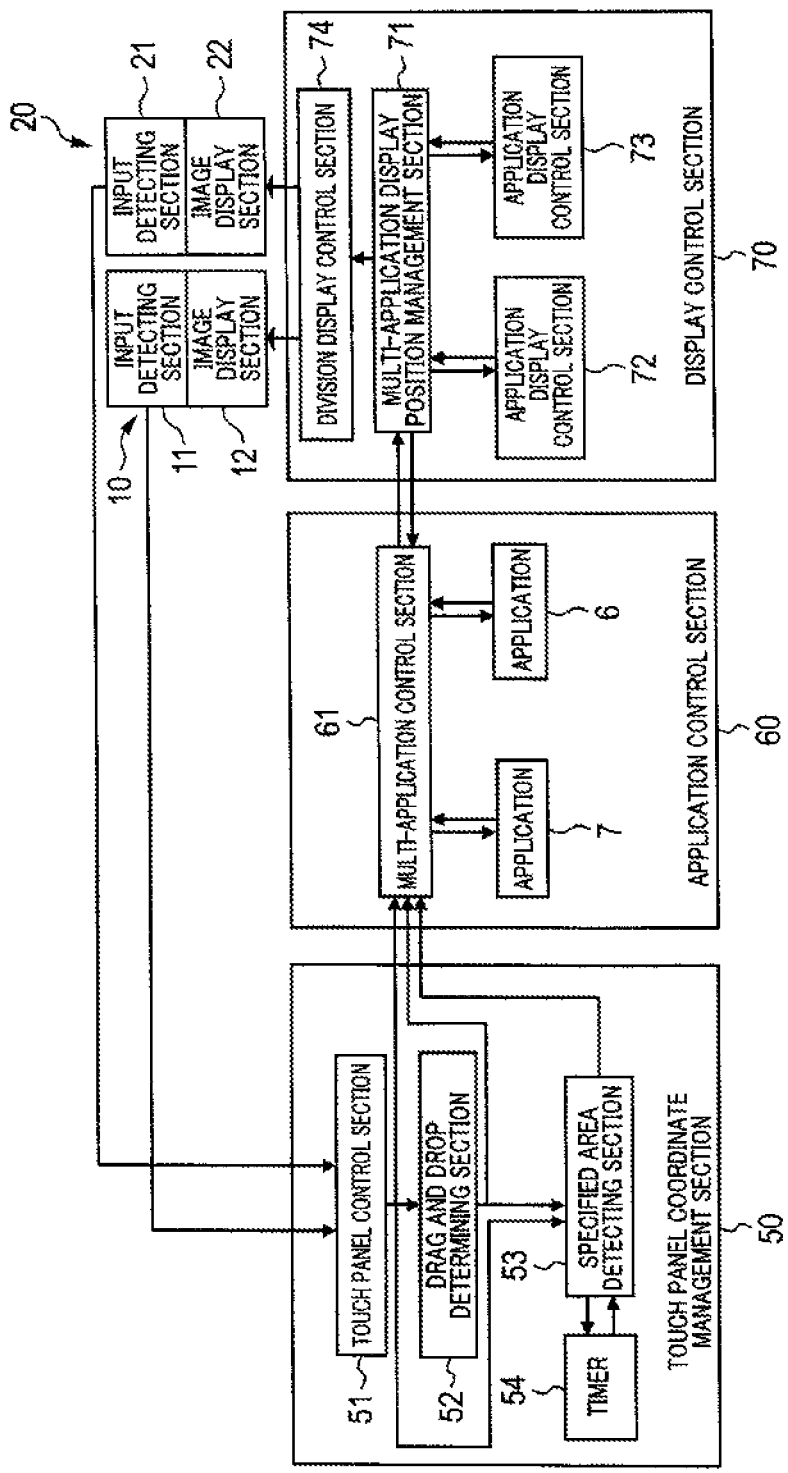
FIG. 3 is a block diagram illustrating an example of a configuration of the information processing apparatus according to Embodiment 1 of the present invention.

FIG. 3 is a block diagram illustrating an example of a configuration of information processing apparatus 100.

In FIG. 3, information processing apparatus 100 includes touch panel 10, touch panel 20, touch panel coordinate management section 50, application control section 60, and display control section 70. Touch panels 10 and 20 are the same as those shown in FIG. 1 and FIGS. 2A and 2B.

Touch panel 10 includes input detecting section 11 and image display section 12.

Input detecting section 11 detects contact with touch panel 10. Thus, input detecting section 11 detects an operation to select object 4 displayed in application 7 as shown in FIG. 1 and FIGS. 2A and 2B. Further, input detecting section 11 outputs an X coordinate and a Y coordinate that represent the position of the selected object (hereinafter, referred to as "position information") to touch panel control section 51 of touch panel coordinate management section 50. The user makes contact with touch panel 10 with a finger or using a predetermined device (hereinafter, referred to as a "finger or the like").

Image display section 12 displays a screen or the like of an application on the basis of information input from division display control section 74. A liquid crystal display (LCD), an organic electro luminescence (EL) or the like may be cited as an example of image display section 12.

Touch panel 20 includes input detecting section 21 and image display section 22. These sections have the same functions as in input detecting section 11 and image display section 12 of touch panel 10, respectively. Accordingly, since the configuration of touch panel 10 is the same as the configuration of touch panel 20, a description of the configuration of touch panel 20 will be omitted.

Touch panel coordinate management section 50 includes touch panel control section 51, drag and drop determining section 52, specified area detecting section 53, and timer 54.

Touch panel control section 51 receives an input of position information from each of input detecting sections 11 and 21. Further, touch panel control section 51 outputs the received position information to drag and drop determining section 52, specified area detecting section 53 and multi-application control section 61.

Drag and drop determining section 52 determines whether drag or drop is performed, on the basis of the position information input from touch panel control section 51. Further, drag and drop determining section 52 outputs determination result information indicating the result of determination to multi-application control section 61. The determination result information refers to information indicating that drag has been performed or that drop has been performed.

Further, when it is determined that drag has been performed, drag and drop determining section 52 sets a drag enabling flag to ON. Further, drag and drop determining section 52 outputs the drag enabling flag that is set to ON to multi-application control section 61 and specified area detecting section 53.

Further, when it is determined that drop has been performed, drag and drop determining section 52 sets the drag enabling flag to OFF. Further, drag and drop determining section 52 outputs the drag enabling flag that is set to OFF to multi-application control section 61 and specified area detecting section 53.

Specified area detecting section 53 receives an input of the drag enabling flag that is set to ON from drag and drop determining section 52. Further, specified area detecting section 53 detects whether an object in the dragged state is present in specified area 5 on the basis of the position information input from touch panel control section 51 and specified area information that is retained in advance. The specified area information refers to information obtained by defining the range of specified area 5 by a plurality of X coordinates and Y coordinates.

When it is detected that the object in the dragged state is present in specified area 5, specified area detecting section 53 controls timer 54 to ON. Here, even if a part of the object is present in specified area 5, specified area detecting section 53 detects that the object is present in specified area 5.

Further, if specified area detecting section 53 receives a notification indicating that time counting is finished from timer 54, specified area detecting section 53 controls timer 54 to OFF, and sets a specified area detection flag to ON. Further, specified area detecting section 53 outputs the specified area detection flag that is set to ON to multi-application control section 61.

If the drag enabling flag that is set to OFF is received from drag and drop determining section 52, specified area detecting section 53 sets the specified area detection flag from ON to OFF. Further, specified area detecting section 53 outputs the specified area detection flag that is set to OFF to multi-application control section 61.

Timer 54 starts counting a specified time by being controlled to ON by specified area detecting section 53. Further, if the counting of the specified time is finished, timer 54 notifies specified area detecting section 53 that the time counting is finished. Then, timer 54 is controlled to OFF by specified area detecting section 53, and resets the counted time.

Application control section 60 includes applications 6 and 7 and multi-application control section 61.

Applications 6 and 7 are the same as shown those in FIG. 1 and FIGS. 2A and 2B.

Applications 6 and 7 may be an application that allows a user to customize a home screen, which is called a home application. Applications 6 and 7 perform input and output of a variety of information with respect to multi-application control section 61. The variety of information will be described later.

Multi-application control section 61 notifies application 6 or 7 of the position information received from touch panel control section 51, the determination result information received from drag and drop determining section 52 and display position information received from display control section 70. Application 6 or 7 performs a predetermined process on the basis of the input information. Further, application 6 or 7 outputs process result information indicating the result of the process to multi-application control section 61. Multi-application control section 61 outputs a display instruction to multi-application display-position management section 71 of display control section 70 on the basis of the input process result information.

Further, multi-application control section 61 determines a process to be executed on the basis of the drag enabling flag input from drag and drop determining section 52 and the specified area detection flag received from specified area detecting section 53.

For example, when both of the drag enabling flag and the specified area detection flag are set to ON, multi-application control section 61 determines to perform the slide display operation for application 6 or 7. Further, multi-application control section 61 outputs a display instruction for performing the slide display operation for application 6 or 7 (hereinafter, referred to as a "slide display instruction") to multi-application display-position management section 71.

The slide display operation refers to the operation in which, when applications are respectively displayed on two touch panels, one of the applications is moved and then displayed on the touch panel where the other one of the applications is displayed, as described in FIGS. 2A and 2B. Here, the slid application is displayed under the object in the dragged state.

Further, for example, when both of the drag enabling flag and the specified area detection flag are set to OFF, multi-application control section 61 transmits information on the dropped object to application 6 or 7 that has been slid and displayed. For example, when object 4 of application 7 is dropped to application 6 that has been slid and displayed, multi-application control section 61 obtains information on object 4 from application 7, and outputs the information to application 6. Further, multi-application control section 61 outputs a display instruction for performing the slide-return display operation (hereinafter, referred to as a "slide-return display instruction") to multi-application display-position management section 71. Here, the slide-return display operation refers to the operation in which the application that has been slid and displayed is slid back and displayed at the original position when the slide display operation is performed.

Display control section 70 includes multi-application display-position management section 71, application display control sections 72 and 73, and division display control section 74.

Multi-application display-position management section 71 outputs the display instruction received from multi-application control section 61 to application display control section 72 or 73. Here, the display instruction corresponds to a slide display instruction or a slide-return display instruction, for example. Then, upon reception of the display position information from application display control section 72 or 73, multi-application display-position management section 71 updates display position information that is retained in multi-application display-position management section 71 to the received display position information. Further, multi-application display-position management section 71 outputs the updated display position information to multi-application control section 61. The display position information refers to information indicating positions where applications 6 and 7 are displayed on touch panels 10 and 20, respectively. In the display position information, the display position of each application is defined by an X coordinate and a Y coordinate. For example, as in the slide display operation of the present embodiment, when an application is slid only in the transverse direction, the display position information may be defined by only the Y coordinate.

The positions where applications 6 and 7 are displayed by default (hereinafter, referred to as "default display positions") are previously determined, respectively. The default display positions of applications 6 and 7 are different from each other. For example, the positions where applications 6 and 7 are shown in FIG. 2A correspond to the default display positions, respectively.

Further, the display positions of applications 6 and 7 obtained as the result of the slide display operation (hereinafter, referred to as "slide display positions") are also determined previously. The slide display positions of applications 6 and 7 are the same. For example, the position where application 6 is displayed in FIG. 2B corresponds to a common slide display position of applications 6 and 7. The slide display position includes the entirety of specified area 5, for example. Thus, at least a part of object 4 in the dragged state overlaps with application 6 that has been slid and displayed. In this state, the user can drop object 4 to application 6. Accordingly, the slide display position may refer to the position where an object is the dragged state can be dropped to the slid application.

Application display control section 72 includes display position information indicating the default display position of application 7 and display position information indicating the slide display position of application 7. Further, application display control section 73 includes display position information indicating the default display position of application 6 and display position information indicating the slide display position of application 6.

Further, multi-application display-position management section 71 generates full-screen display information on the basis of the updated display position information, and outputs the result to division display control section 74. Here, the full-screen display information corresponds to image data displayed on touch panels 10 and 20.

Application display control section 72 changes display position information on application 7 that is retained in application display control section 72 on the basis of the display instruction received from multi-application display-position management section 71. Application display control section 73 changes display position information on application 6 that is retained in application display control section 73 on the basis of the display instruction input from multi-application display-position management section 71. For example, upon reception of the slide display instruction for application 6, application display control section 73 changes display position information indicating the default display position to display position information indicating the slide display position. On the other hand, upon reception of the slide-return display instruction for application 6, application display control section 73 changes the display position information indicating the slide display position to the display position information indicating the default display position. The operation of application display control section 72 is the same as that of application display control section 73. In this way, upon completion of the change of the display position, application display control sections 72 and 73 output the changed display position information to multi-application display-position management section 71.

Division display control section 74 performs a control so that image data indicated by the full-screen display information received from multi-application display-position management section 71 is dividedly displayed on touch panels 10 and 20. That is, division display control section 74 divides the image data indicated by the full-screen display information and outputs the result to image display sections 12 and 22.

Although not shown, information processing apparatus 100 includes a central processing unit (CPU), a recording medium such as a read only memory (ROM) that stores a control program, and a working memory such as a random access memory (RAM). In this case, the above-mentioned functions of the sections are realized by the control program executed by the CPU.

According to information processing apparatus 100, drag and drop determining section 52 first sets the drag enabling flag to ON when object 4 of application 7 is dragged on touch panel 20. Then, when it is detected that object 4 in the dragged state stays in specified area 5 of touch panel 20 for a specified period of time, specified area detecting section 53 sets the specified area detection flag to ON. Then, when both of the drag enabling flag and the specified area detection flag are set to ON, multi-application control section 61 determines that application 6 displayed on touch panel 10 is to be slid toward touch panel 20 and displayed on touch panel 20. Then, multi-application display-position management section 71 controls application display control section 73 and division display control section 74 to execute the slide display operation of application 6. In this way, application 6 moves in parallel toward touch panel 20 and displayed on touch panel 20. As a result, as shown in FIG. 2B, application 6 is displayed over touch panels 10 and 20 under object 4 in the dragged state and on top of application 7. Further, application 6 is displayed to include object 4 while being dragged. In this state, if the user drops object 4, object 4 is moved to application 6 from application 7.

That is, according to information processing apparatus 100, in order for the user to move object 4 from application 7 to application 6, the user can simply drag object 4 into specified area 5 of touch panel 20 on which application 7 is displayed. That is, it is not necessary for the user to drag object 4 all the way to touch panel 10 on which application 6 is displayed. Accordingly, information processing apparatus 100 can solve the above-mentioned problem in that the finger used to operate the touch panel does not reach the display area of the application which is the moving destination of the object. Further, information processing apparatus 100 can solve the above-mentioned problem in that the operation error easily occurs due to the length of the dragging distance or the discontinuity between the touch panels. As a result, information processing apparatus 100 of the present embodiment allows the user to easily move an object between applications that are simultaneously displayed on touch panels.

<Operation of Information Processing Apparatus>

Figure 4:
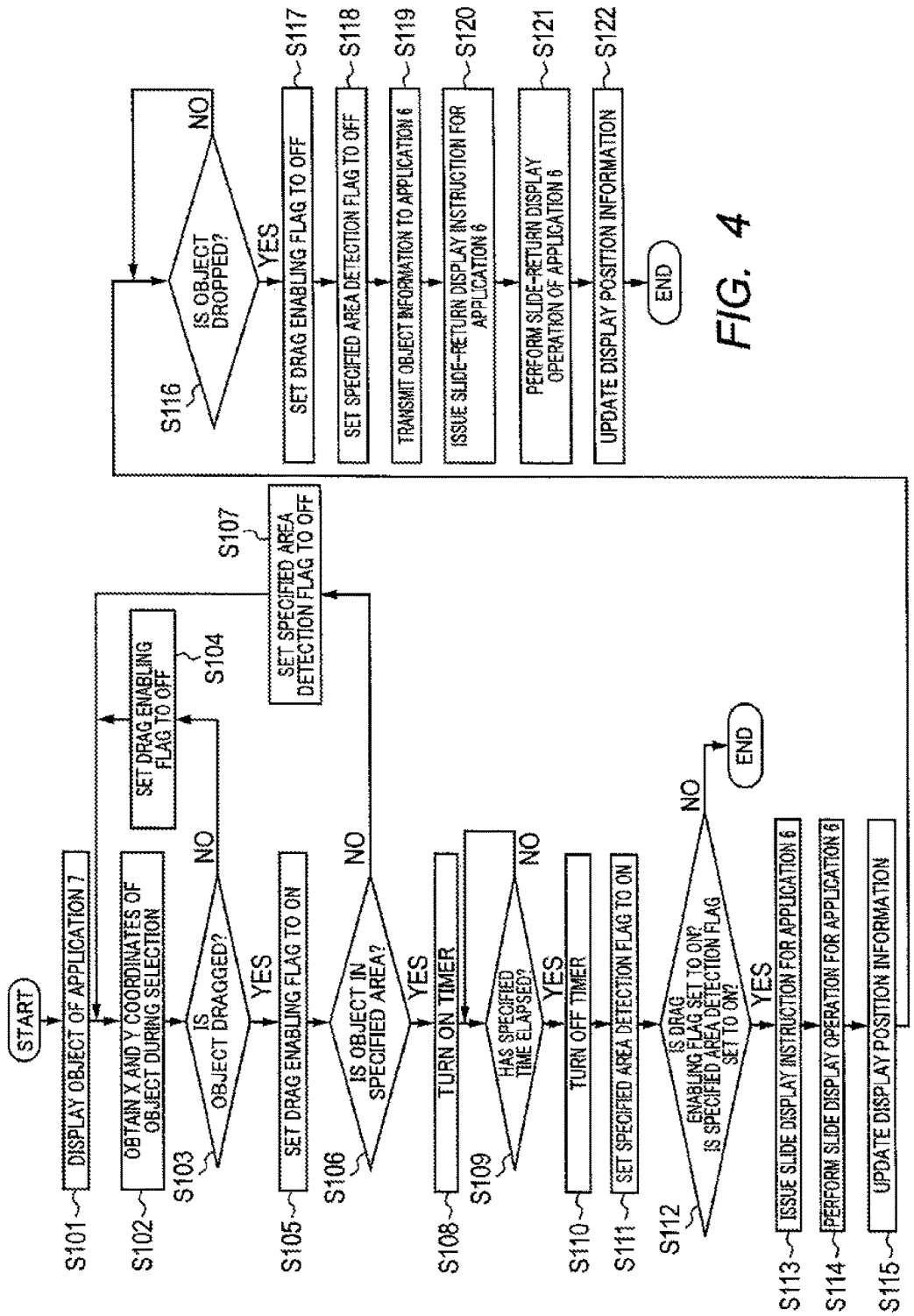
FIG. 4 is a flowchart illustrating an example of an operation of the information processing apparatus according to Embodiment 1 of the present invention.

FIG. 4 is a flowchart illustrating an example of an operation of information processing apparatus 100. Hereinafter, a case where the user moves one object of application 7 to application 6 will be described as an example.

In step S101, touch panel 20 displays a plurality of objects of application 7 as shown in FIG. 1. The objects may be thumbnails, for example. Meanwhile, touch panel 10 displays a mail creating screen of application 6 as shown in FIG. 1. Here, if the user performs an operation to select object 4, input detecting section 21 outputs position information indicating an X coordinate and a Y coordinate of selected object 4 to touch panel control section 51. Then, if the user drags object 4, input detecting section 21 outputs position information on dragged object 4 to touch panel control section 51.

In step S102, if the position information on object 4 during selection is obtained from input detecting section 21, touch panel control section 51 outputs the result to drag and drop determining section 52.

In step S103, drag and drop determining section 52 determines whether or not object 4 is dragged on the basis of the received position information. For example, when there is a change in the received position information, touch panel control section 51 determines that object 4 is dragged. On the other hand, when there is no change in the received position information, touch panel control section 51 determines that object 4 is not dragged.

When object 4 is not dragged as a result of determination (NO in S103), the procedure goes to step S104.

In step S104, drag and drop determining section 52 sets the drag enabling flag to OFF. Then, the procedure returns to step S102. The initial state of the drag enabling flag is OFF.

On the other hand, when object 4 is dragged as a result of determination (YES in S103), the procedure goes to step S105.

In step S105, drag and drop determining section 52 sets the drag enabling flag to ON. Further, drag and drop determining section 52 outputs the position information on object 4 and the drag enabling flag (ON) to specified area detecting section 53. Further, drag and drop determining section 52 outputs the drag enabling flag (ON) to multi-application control section 61.

In step S106, upon reception of the position information on object 4 and the drag enabling flag (ON), specified area detecting section 53 determines whether or not object 4 is present in specified area 5 on the basis of the position information.

If object 4 is not present in specified area 5 as a result of determination (NO in S106), the procedure goes to step S107.

In step S107, specified area detecting section 53 sets the specified area detection flag to OFF. Then, the procedure returns to step S102. The initial state of the specified area detection flag is OFF.

On the other hand, if object 4 is present in specified area 5 as a result of determination (YES in S106), the procedure goes to step S108.

In step S108, specified area detecting section 53 controls timer 54 to ON to start counting a predetermined time.

In step S109, timer 54 performs time counting until the specified time elapses. Further, if the predetermined time has elapsed (YES in S109), timer 54 notifies specified area detecting section 53 that the time counting is finished.

In step S110, upon reception of the notification indicating that the time counting is finished, specified area detecting section 53 controls timer 54 to OFF to finish the time counting and to reset the time.

In step S111, specified area detecting section 53 sets the specified area detection flag to ON. Further, specified area detecting section 53 outputs the specified area detection flag (ON) to multi-application control section 61.

In step S112, multi-application control section 61 determines whether both of the received drag enabling flag and specified area detection flag are set to ON.

If both of the drag enabling flag and the specified area detection flag are not set to ON as a result of determination (NO in S112), the procedure is finished.

On the other hand, if both of the drag enabling flag and the specified area detection flag are set to ON as a result of determination (YES in S112), the procedure goes to step S113.

In step S113, multi-application control section 61 outputs the slide display instruction for application 6 to multi-application display-position management section 71.

In step S114, multi-application display-position management section 71 that receives the slide display instruction for application 6 performs the slide display operation for application 6. That is, multi-application display-position management section 71 outputs the slide display instruction for application 6 to application display control section 73. Then, application display control section 73 changes the display position information that is retained in application display control section 73 to a predetermined slide display position from a predetermined default display position. Further, upon completion of the change of the display position information, application display control section 73 outputs the changed display position information to multi-application display-position management section 71.

In step S115, multi-application display-position management section 71 updates display position information on application 6 indicating the default display position retained in multi-application display-position management section 71 to display position information indicating the slide display position received from application display control section 73. Further, multi-application display-position management section 71 outputs the updated display position information to multi-application control section 61. Further, multi-application display-position management section 71 generates full-screen display information on the basis of the updated display position information, and outputs the result to division display control section 74. Then, division display control section 74 performs a control so that image data indicated by the received full-screen display information is dividedly displayed on touch panels 10 and 20. As a result, information processing apparatus 100 shifts from the display state shown in FIG. 2A to the display state shown in FIG. 2B.

In step S116, drag and drop determining section 52 determines whether or not object 4 is dropped on the basis of the received position information. For example, when the input of the position information continues, drag and drop determining section 52 determines that object 4 is dragged. On the other hand, when the input of the position information no longer exists, drag and drop determining section 52 determines that object 4 is dropped.

If object 4 is not dropped as a result of determination (NO in step S116), the procedure returns to step S116.

On the other hand, if object 4 is dropped as a result of determination (YES in S116), the procedure goes to step S117.

In step S117, drag and drop determining section 52 sets the drag enabling flag that is set to ON to OFF. Further, drag and drop determining section 52 outputs the drag enabling flag (OFF) to specified area detecting section 53. Further, drag and drop determining section 52 outputs the drag enabling flag (OFF) to multi-application control section 61.

In step S118, upon reception of the drag enabling flag (OFF), specified area detecting section 53 sets the specified area detection flag that is set to ON to OFF. Further, specified area detecting section 53 outputs the specified area detection flag (OFF) to multi-application control section 61.

In step S119, multi-application control section 61 obtains information on object 4 from application 7 by being triggered by reception of both of the drag enabling flag (OFF) and the specified area detection flag (OFF) and transmits the result to application 6. The information on object 4 corresponds to image data such as a moving image or a still image, for example.

In step S120, multi-application control section 61 outputs the slide-return display instruction to multi-application display-position management section 71.

In step S121, multi-application display-position management section 71 that receives the slide-return display instruction for application 6 performs the slide-return display operation for application 6. That is, multi-application display-position management section 71 outputs the slide-return display instruction for application 6 to application display control section 73. Then, application display control section 73 changes the display position information that is retained in application display control section 73 to the default display position from the slide display position. Further, upon completion of the change of the display position information, application display control section 73 outputs the changed display position information to multi-application display-position management section 71.

In step S122, multi-application display-position management section 71 updates the display position information on application 6 indicating the default display position that is retained in multi-application display-position management section 71 to the display position information indicating the slide display position received from application display control section 73. Further, multi-application display-position management section 71 outputs the updated display position information to multi-application control section 61. Further, multi-application display-position management section 71 generates full-screen display information on the basis of the updated display position information, and outputs the result to division display control section 74. Then, division display control section 74 performs a control so that image data indicated by the input full-screen display information is dividedly displayed on touch panels 10 and 20. As a result, information processing apparatus 100 shifts to the display state shown in FIG. 2A from the display state shown in FIG. 2B.

According to the operation of the above-described information processing apparatus 100, when moving object 4 from application 7 to application 6, the user can simply drag object 4 into specified area 5 of touch panel 20 on which application 7 is displayed. That is, it is not necessary for the user to drag object 4 to touch panel 10 on which application 6 is displayed. Accordingly, information processing apparatus 100 can solve the above-mentioned problem in that the finger used to operate the touch panel does not reach the display area of the application which is the moving destination of the object. Further, information processing apparatus 100 can solve the above-mentioned problem in that the operation error easily occurs due to the length of the dragging distance or the discontinuity between the touch panels. As a result, information processing apparatus 100 of the present embodiment allows the user to easily move an object between applications that are simultaneously displayed on touch panels.

(Embodiment 2)

In Embodiment 1, an example in which, when information processing apparatus 100 starts two applications, one application of the two application is slid and displayed has been described. In the present embodiment, an example of the slide display operation performed when information processing apparatus 100 starts three or more applications will be described.

For example, when information processing apparatus 100 starts three or more applications, the applications are displayed in the manner illustrated FIG. 2A. That is, applications 6 and 7 are displayed on touch panels 10 and 20, respectively, but the other application is not displayed. In this embodiment, it is assumed that the user moves object 4 of application 7 to the application that is not displayed, which is an application other than application 6.

Figure 5:
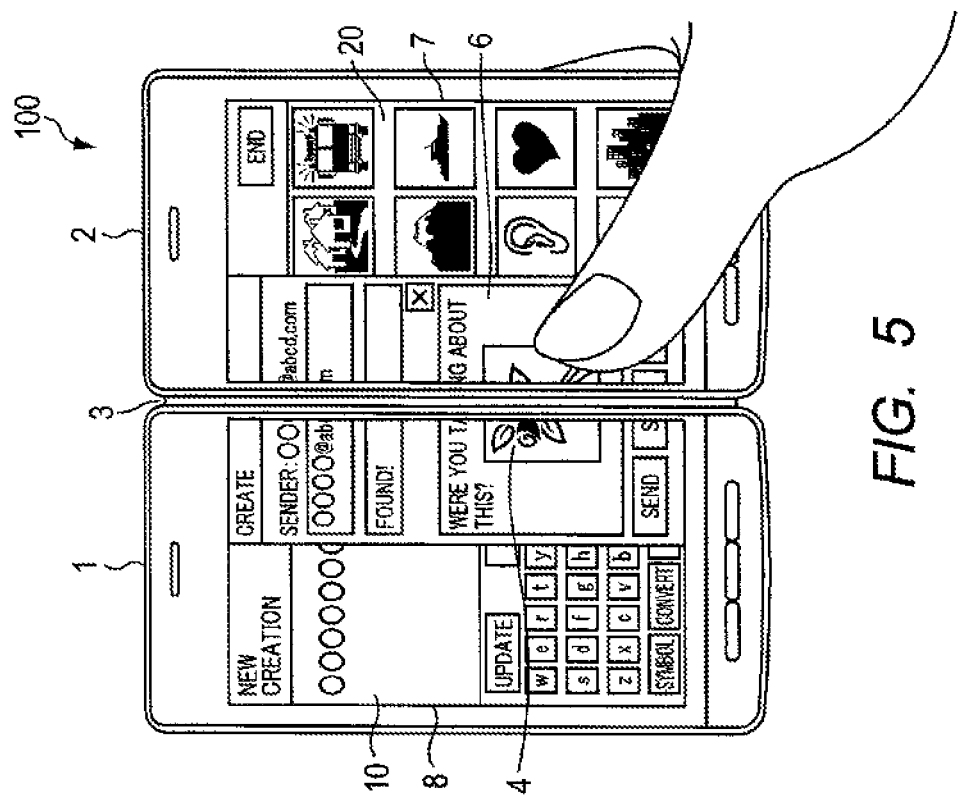
FIG. 5 is a diagram illustrating the outline of an operation of an information processing apparatus according to Embodiment 2 of the present invention.

In this case, the user drags object 4 to specified area 5 as described in Embodiment 1, and waits for a predetermined time with object 4 being dragged (in the dragged state). Thus, information processing apparatus 100 performs the slide display operation for application 6 that is being displayed on touch panel 10, in a way similar to the operation described in Embodiment 1. Then, as shown in FIG. 5, information processing apparatus 100 displays application 8 that is hidden behind the area where application 6 is displayed on touch panel 10, and performs the slide display operation for application 8, similarly to application 6. Here, information processing apparatus 100 displays application 8 that has been slid on top of application 6 that has been slid before application 8. When yet another application is started and running, information processing apparatus 100 repeats the same operation as the above-described operation for application 8.

In this way, when three or more applications are started and running, information processing apparatus 100 of the present embodiment automatically switches between applications one by one and performs the slide display operation like page turning. Accordingly, the user can simply waits with object 4 being dragged in specified area 5 until a desired application is slid and displayed. That is, when a plurality of applications are started and running, the user can easily move an object between applications without performing an operation to find a desired application being displayed, or an operation to display a desired application, or the like.

(Embodiment 3)

In Embodiment 1, an example in which the information processing apparatus includes two touch panels has been described. In the present embodiment, an example of the slide display operation performed when the information processing apparatus includes one touch panel will be described.

<Exterior of Information Processing Apparatus 101>

Figure 6:
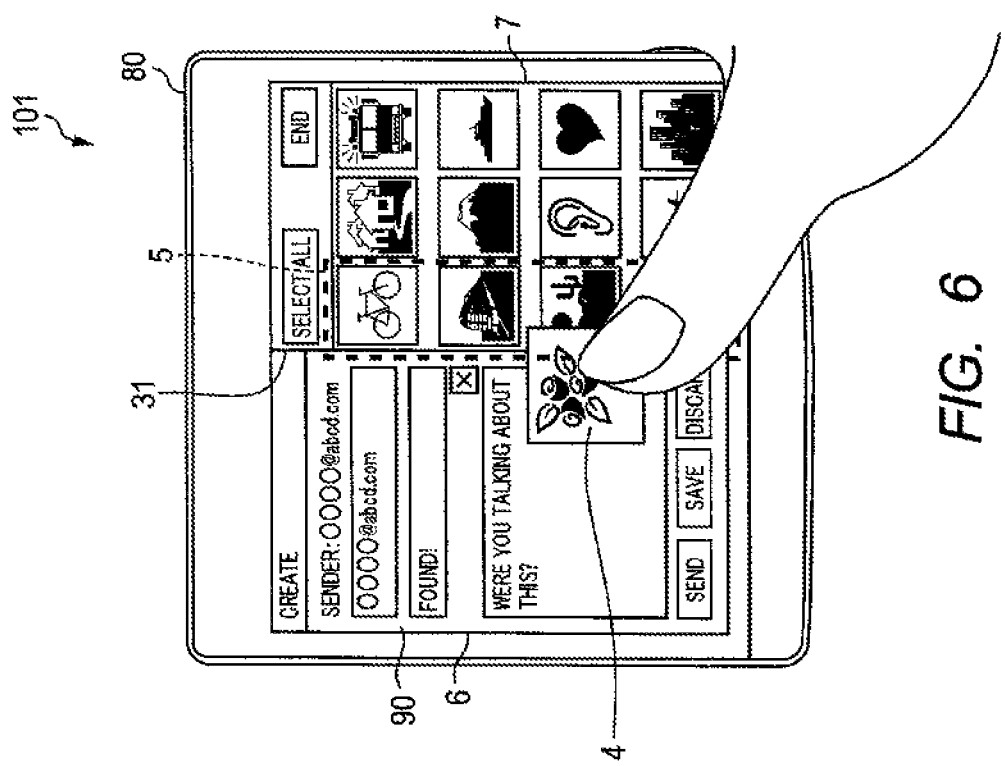
FIG. 6 is a diagram illustrating an example of an exterior of an information processing apparatus according to Embodiment 3 of the present invention.

FIG. 6 is a diagram illustrating an example of an exterior of information processing apparatus 101 according to the present embodiment. A smart phone, a tablet or the like may be cited as an example of the application target of information processing apparatus 101.

In FIG. 6, information processing apparatus 101 includes housing 80 of a rectangular flat plate shape. Housing 80 includes touch panel 90. In the example in FIG. 6, touch panel 90 displays application 7 on the right half of touch panel 90 and application 6 on the left half thereof. Reference numeral 31 in the figure represents a boundary between the display area of application 6 and the display area of application 7. Specified area 5 is positioned near boundary 31 in touch panel 90.

<Configuration of Information Processing Apparatus 101>

Figure 7:
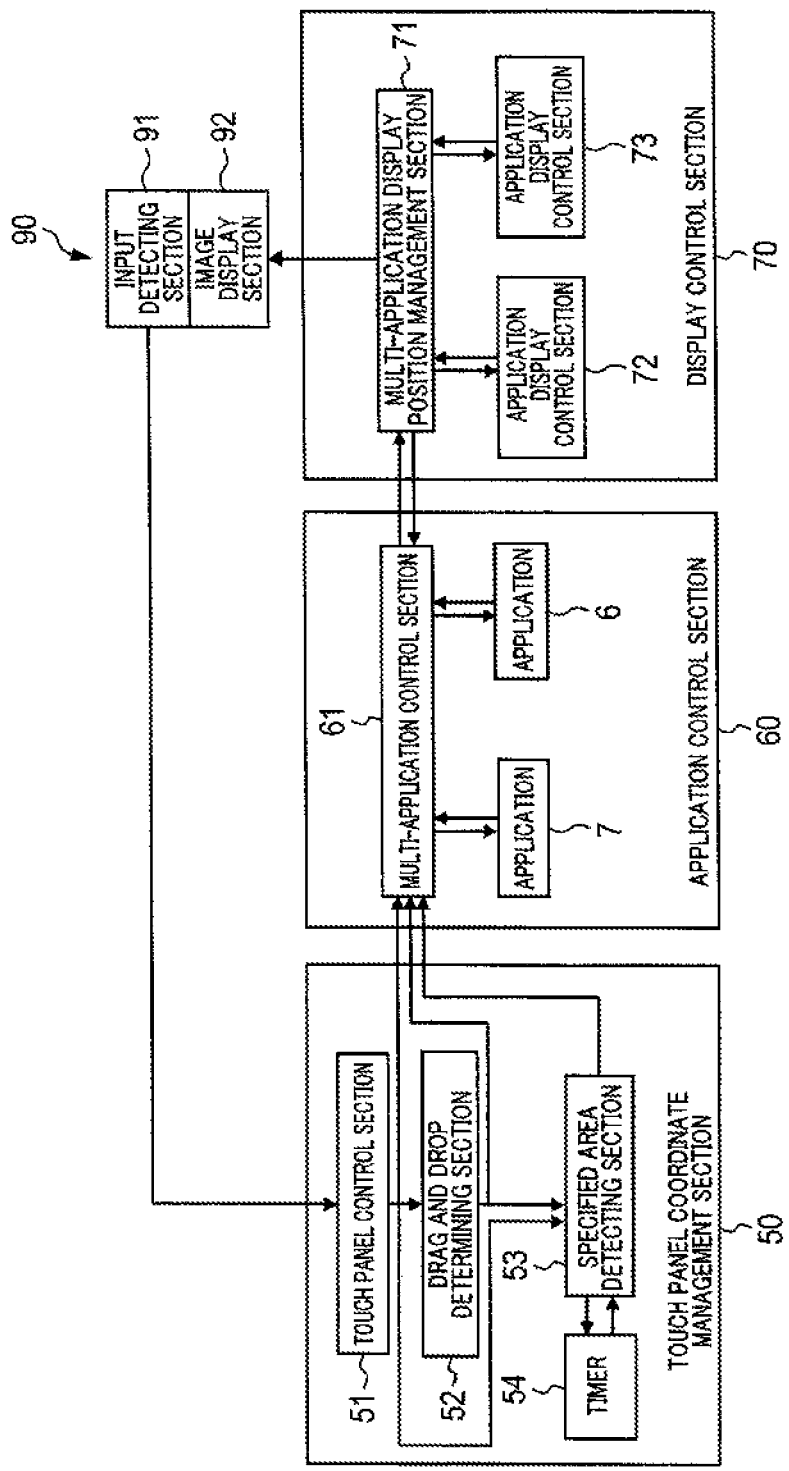
FIG. 7 is a block diagram illustrating an example of a configuration of the information processing apparatus according to Embodiment 3 of the present invention.

FIG. 7 is a block diagram illustrating an example of a configuration of information processing apparatus 101.

In FIG. 7, information processing apparatus 101 includes touch panel 90, touch panel coordinate management section 50, application control section 60 and display control section 70. Since information processing apparatus 101 is configured to include only one touch panel 90, display control section 70 does not include division display control section 74 shown in FIG. 3. Touch panel 90 is the same as that shown in FIG. 6 and includes input detecting section 91 and image display section 92. Since touch panel coordinate management section 50, application control section 60 and display control section 70 shown in FIG. 7 have been already described with reference to FIG. 3, the descriptions of these components will be omitted. Further, since input detecting section 91 and image display section 92 have the same functions as in input detecting sections 11 and 12 and image display sections 12 and 22 shown in FIG. 3, the descriptions of these components will be omitted.

<Operation of Information Processing Apparatus 101>

An operation of information processing apparatus 101 is the same as the operation of information processing apparatus 100. For example, in FIG. 6, when a user moves object 4 of application 7 to application 6, the user drags object 4 to specified area 5. Then, the user waits for a predetermined time with the object being dragged. Thus, information processing apparatus 101 slides application 6 displayed on the left half of touch panel 90 toward the right half of touch panel 90. As a result of the slide display operation, application 6 is displayed on top of application 7 and under object 4 at the central part of touch panel 90, similarly to FIG. 2B.

In the present embodiment, when a plurality of applications are started and running, information processing apparatus 101 may apply the slide display operation of Embodiment 2 described above.

According to information processing apparatus 101 described above, even when the information processing apparatus is configured to include only one touch panel, it is possible to obtain the same effects as the effects described in Embodiments 1 and 2.

Embodiments 1 to 3 have been described thus far, but the description provided above is only an example, and various modifications may be made. For example, the operation of information processing apparatus 100 described above may be realized by software in cooperation with hardware.

Further, in Embodiments 1 to 3 described above, an example in which applications 6 and 7 are displayed while being aligned horizontally has been described, but the invention is not limited to this example. For example, the present invention may also be applied to a case where applications 6 and 7 are displayed while being aligned vertically.

Further, in Embodiments 1 and 2 described above, an example in which two touch panels are provided has been described, but the present invention is not limited to this example. For example, the present invention may also be applied to a case where three or more touch panels are provided.

Further, in Embodiments 1 to 3 described above, an example in which application 6 slides toward application 7 (parallel movement) has been described, but the present invention is not limited to this example. Instead of the slide display operation, the present invention may adopt a display method in which application 6 is deleted once from touch panel 10 and appears on top of application 7 being displayed on touch panel 20, for example.

An information processing apparatus according to the present invention described thus far is an information processing apparatus including a touch panel that simultaneously displays a first application and a second application, the information processing apparatus including: a detecting section that detects that an object of the first application stays in a specified area of the touch panel for a predetermined period of time while the object is being dragged; and a control section that moves the second application being displayed to a position where the object is droppable, by being triggered by the detection of the staying of the object.

In the information processing apparatus according to the disclosure: the detecting section detects that the object is dropped to the second application after the second application being displayed is moved to the position where the object is droppable; and the control section moves the second application being displayed to an original position by being triggered by the detection of the drop.

In the information processing apparatus according to this disclosure, when moving the second application being displayed to the position where the object is droppable, the control section displays the second application under the object being displayed and on top of the first application being displayed.

In the information processing apparatus according to this disclosure, when a third application that is not displayed on the touch panel is started in addition to the first application and the second application, the control section displays the third application on the touch panel after moving the second application being displayed, and moves the third application being displayed to the position where the object is droppable.

In the information processing apparatus according to this disclosure, when a plurality of the third applications are started, the control section moves and displays the third applications sequentially after moving the second application being displayed.

In the information processing apparatus according to this disclosure, the specified area is positioned near a boundary between the first application being displayed and the second application being displayed.

In the information processing apparatus according to this disclosure: the touch panel includes a first touch panel that displays the first application and a second touch panel that displays the second application; and the first touch panel includes the specified area.

An information processing method according to the disclosure is an information processing method performed by a terminal including a touch panel that simultaneously displays a first application and a second application, the information processing method including: detecting that an object of the first application stays in a specified area on the touch panel for a predetermined period of time while the object is being dragged; and moving the second application to a position where the object is droppable by being triggered by the detection of the staying of the object.

An information processing program according to this disclosure is an information processing program causing a computer of a terminal to execute processing, the terminal including a touch panel that simultaneously displays a first application and a second application, the information processing program causing the computer to execute the processing including: detecting that an object of the first application stays in a specified area on the touch panel for a predetermined period of time while the object is being dragged; and moving the second application to a position where the object is droppable by being triggered by the detection of the staying of the object.

The disclosure of Japanese Patent Application No. 2012-119487, filed on May 25, 2012, including the specification, drawings and abstract, is incorporated herein by reference in its entirety.

INDUSTRIAL APPLICABILITY

The present invention is useful as an information processing apparatus, an information processing method and an information processing program applied to a terminal that includes a touch panel.

REFERENCE SIGNS LIST 1, 2, 80 Housing
3 Hinge
4 Object
5 Specified area
6, 7, 8 Application
10, 20, 90 Touch panel
11, 21, 91 Input detecting section
12, 22, 92 Image display section
31 Boundary
50 Touch panel coordinate management section
51 Touch panel control section
52 Drag and drop determining section
53 Specified area detecting section
54 Timer
60 Application control section
61 Multi-application control section
70 Display control section
71 Multi-application display-position management section
72, 73 Application display control section
74 Division display control section
100, 101 Information processing apparatus

The invention claimed is:

1. A method comprising the steps of:
displaying an object on a touch panel of an information processing terminal;
displaying an application at a first position of the touch panel simultaneously with the displaying of the object, the first position being a position where the object is not droppable, the application comprising a plurality of of graphical controls;
detecting that the object is present in a specified area on the touch panel while the object is being dragged;
starting a timer of the information processing terminal to count a time the object remains present in the specified area on the touch panel;
detecting that the time counted by the timer has reached a predetermined period of time; and
moving the application being displayed from the first position to a second position where the object is droppable, being triggered by the detection of the object being present in the specified area for the predetermined period of time.

2. The method according to claim 1, wherein
during the step of moving, the application is moved under the object being displayed.

3. The method according to claim 1, wherein
during the step of moving, the application is moved without reduction in display size of the application.

4. An information processing apparatus comprising:
a touch panel which in operation displays an object on the touch panel and an application at a first position of the touch panel simultaneously with the displaying of the object, the first position being a position where the object is not droppable and the application comprising a plurality of of graphical controls;
a timer that counts a time the object remains present in a specified area on the touch panel while the object is being dragged;
a controller that detects that the object has remained present in the specified area on the touch panel for a predetermined period of time while the object is being dragged; and moves the application being displayed from the first position to a second position where the object is droppable, being triggered by the detection of the object being present in the specified area for the predetermined period of time.

* * * * *